(No Model.) 2 Sheets—Sheet 2.

W. I. ELY.
CORN STALK HARVESTER.

No. 253,358. Patented Feb. 7, 1882.

WITNESSES:
Francis McArdle
C. Sedgwick

INVENTOR:
W. I. Ely
BY Munn & Co.
ATTORNEYS.

UNITED STATES PATENT OFFICE.

WILLIAM I. ELY, OF FREEHOLD, NEW JERSEY.

CORNSTALK-HARVESTER.

SPECIFICATION forming part of Letters Patent No. 253,358, dated February 7, 1882.

Application filed October 26, 1881. (No model.)

*To all whom it may concern:*

Be it known that I, WILLIAM I. ELY, of Freehold, in the county of Monmouth and State of New Jersey, have invented certain new and useful Improvements in Cornstalk-Harvesters, of which the following is a full, clear, and exact description.

Reference is to be had to the accompanying drawings, forming part of this specification, in which similar letters of reference indicate corresponding parts in all the figures.

Figure 1:
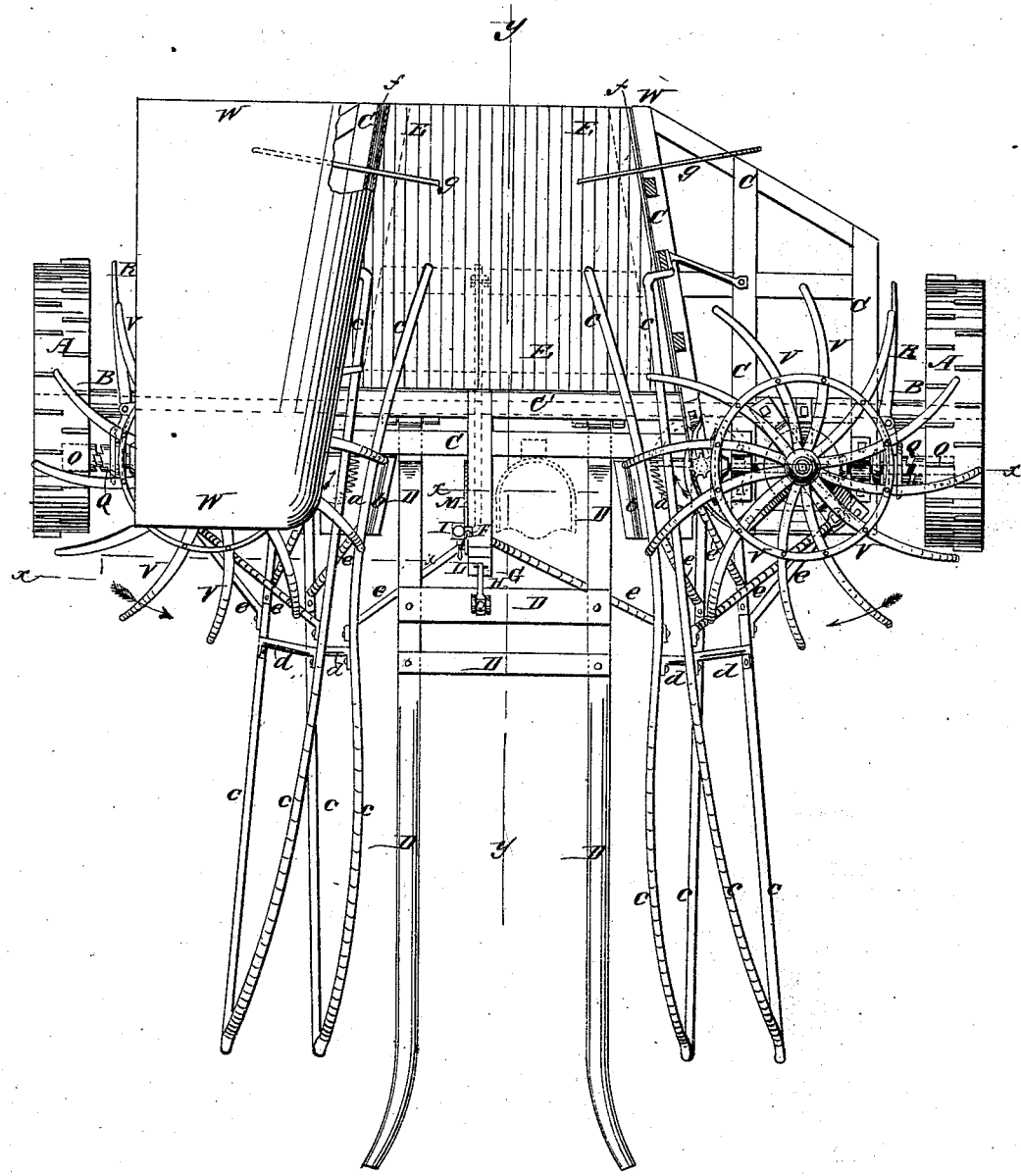
Figure 2:
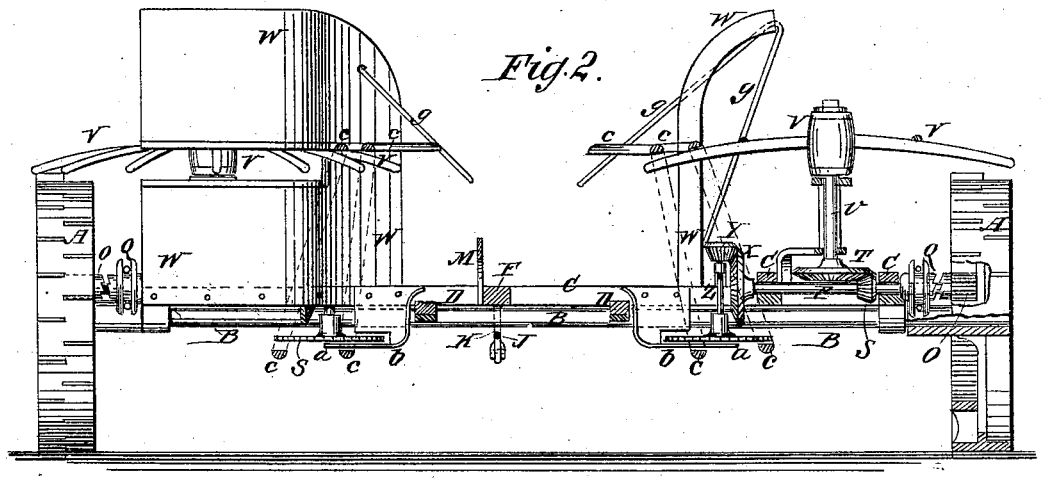
Figure 3:
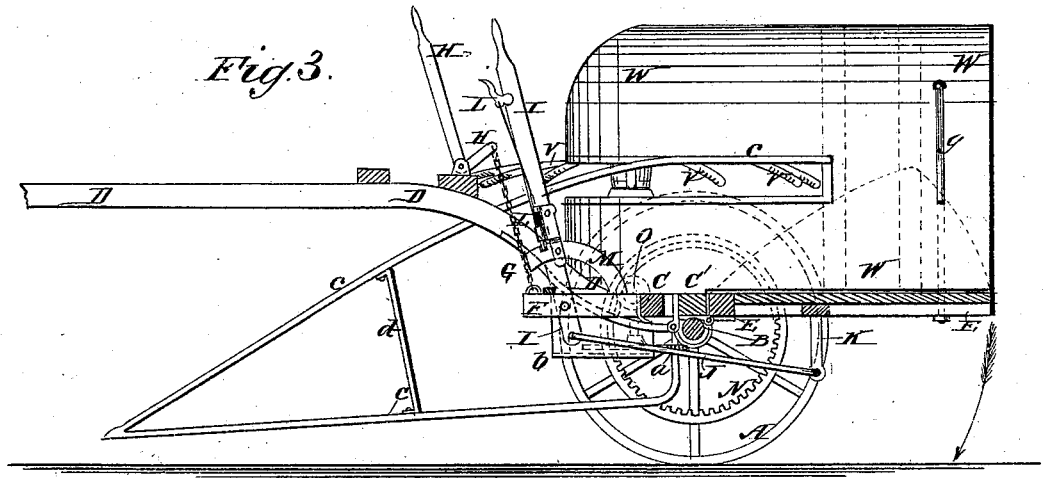
Figure 4:
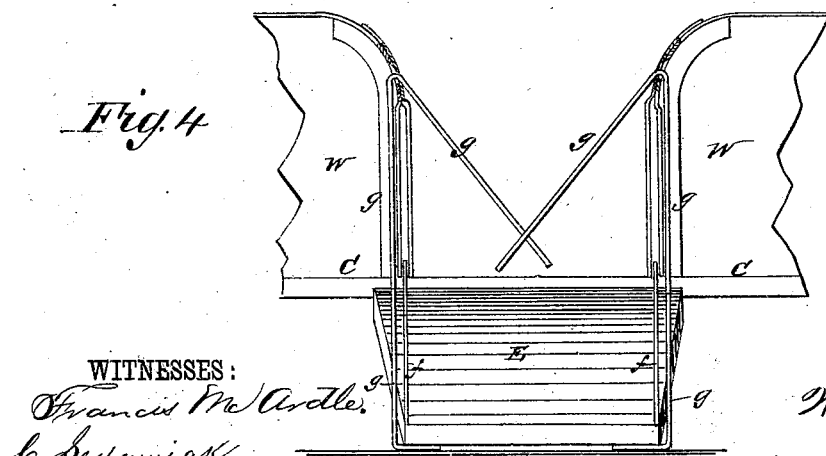

Figure 1, Sheet 1, is a plan view, partly in section, of my improvement. Fig. 2, Sheet 2, is a sectional front elevation of the same, taken through the broken line $x\,x\,x\,x$, Fig. 1. Fig. 3, Sheet 2, is a sectional side elevation of the same, taken through the line $y\,y$, Fig. 1. Fig. 4, Sheet 2, is a rear elevation of the middle part of the same, parts being broken away.

The object of this invention is to improve the construction of the cornstalk-harvesters for which Letters Patent No. 232,474 were granted to me September 21, 1880, in such a manner as to make them more convenient in use and more reliable in operation.

A represents the wheels, to the axle B of which is attached the frame C.

To the forward side of a cross-bar, C', of the frame C, placed directly above the axle B, are connected the rear ends of the thills D by ordinary thill-couplings.

To the rear side of the cross-bar C' is hinged the forward edge of the platform E, which is tapered toward its rear end, and is placed in a correspondingly-shaped opening in the frame C. To the centers of the forward cross-bars of the frame C is rigidly attached a short forwardly-projecting arm, F, to the forward end of which is attached the lower end of the chain G. The upper end of the chain G is attached to the end of the short arm of an angle-lever, H, which is pivoted at its angle to the rear cross-bar of the thills D, and its long arm projects upward into such a position that it can be conveniently reached and operated by the driver from his seat. The lever H can be held in place, when adjusted, by a pawl and catch-bar or other suitable means.

To the side of the arm F is pivoted the lever I, the lower end of which projects below the said arm, and to it is attached the forward end of a connecting-bar, J. The bar J passes back beneath the axle B, and is pivoted at its rear end to the lower end of the hanger K, the upper end of which is rigidly attached to the middle part of the lower side of the platform E. With this construction the platform E can be lowered to drop a collected bundle and again raised to receive stalks for another bundle by operating the lever I.

With the lever I is connected a spring lever-pawl, L, which engages with a curved catch-bar, M, attached to the arm F to hold the said lever I, and with it the platform E, in position.

To each of the wheels A is attached a large internally-toothed gear-wheel, N, into the teeth of which mesh the teeth of a small gear-wheel, O. The gear-wheel O runs loose upon the outer end of a short shaft, P, and is made to carry the said shaft P with it in its revolution by a sliding clutch, Q, placed upon the shaft P, and thrown into and out of gear with the gear-wheel O by operating the clutch-lever R, the forked lower end of which rides in a groove in the said clutch, and which is pivoted to a support attached to the frame C. The shaft P revolves in bearings attached to the frame C, and to the said shaft is attached a small beveled-gear wheel, S, the teeth of which mesh into the teeth of a larger beveled-gear wheel, T, attached to the lower end of the upright shaft U. The shaft U revolves in supports attached to the frame C, and to its upper end is attached a spoke-wheel, V, the spokes or arms of which are curved downward or dished, as shown in Figs. 2 and 3, and are also curved to the rearward, as shown in Fig. 1. As the spoke-wheel V revolves its arms or spokes project through a horizontal slot in the casing W, so as to press the upper part of the stalks to the rearward and cause the said stalks to fall upon the platform E. The casing W is attached at its lower edge to the frame C, and extends back along the edge of the platform E. The forward and upper parts of the casing W are curved outward to keep the stalks from falling over the edges of the said casing and preventing the mechanism from operating properly.

To the inner end of each of the shafts P is attached a large beveled-gear wheel, X, the teeth of which mesh into the teeth of a small beveled-gear wheel, Y, attached to the upper end of the short upright shaft Z. The shaft Z projects a little below the frame C, and to its lower end is attached the cutter $a$, which is made in circular form and with a serrated or smooth edge, the said cutters being inclined forward and made sharp. The inner parts of the cutters $a$ are protected by a plate, $b$, attached to the frame C, and which leaves exposed the parts of the said cutters that operate upon the stalks.

The stalks are guided to the cutters $a$ by the guides $c$, a pair of which is used with each cutter $a$. The guides $c$ are made V-shaped, and are placed with their angles forward and with their lower arms near the ground and nearly horizontal. The rear parts of the lower arms of the guides $c$ are bent upward and are firmly attached to the frame C. The upper arm of the outer guide $c$ of each pair passes back along the inner side of the casing W, and is bent outward, passes through the casing, and is attached to a supporting-post of the said casing. The upper arm of the inner guide of each pair passes back at a little distance from the upper arm of the outer guide, and its rear part is left free and is slightly curved inward, as shown in Fig. 1. The arms of each guide $c$ are connected at their middle parts by tie rods or stays $d$, and are strengthened in position by braces $e$. With this construction, the guides $c$ will guide upright stalks, and will raise and guide bent stalks back toward the cutters $a$. As the stalks approach the rear parts of the guides $c$ they are struck by the arms or spokes of the wheels V, by which they are forced against the cutters $a$, and are then forced back and made to fall upon the platform E, ready to be dropped to the ground when a sufficient number has been collected for a bundle.

The rear parts of the casings W are made with double or hollow walls, and to the side edges of the platform E are attached upwardly-projecting flanges $f$, which, when the said platform E is raised into a horizontal position, enter the said casing W, as shown in Fig. 4. By this construction cornstalks will be prevented from getting between the platform E and the frame C or the lower edge of the casings W, and impeding the movements of the said platform.

To the rear corners of the platform E are attached the ends of rods $g$, which pass up along the outer sides of the rear parts of the casings W, are bent at an acute angle, and pass through guide-holes in the upper parts of the said casings W. With this construction, when the platform E is lowered the free parts of the rods $g$ are projected inward, and meet and cross each other above the rear parts of the said platform E to receive and support any stalks that may fall while the platform is lowered. When the platform E is raised the angles of the rods $g$ pass up beneath the upper parts of the casings W, allowing the stalks supported by the said rods to drop to the platform, and withdrawing the free arms of the said rods beneath the upper parts of the casings W, so as to be out of the way.

Having thus fully described my invention, I claim as new and desire to secure by Letters Patent—

1. The combination of the hinged platform E, the frame C, having arms F, the chains G, the angle-lever H, the lever I, pivoted to arm F, and the connecting-bar J, pivoted to hanger K, said hanger being rigidly attached to the middle of the lower side of platform, as and for the purpose specified.

2. The combination, with the cutters $a$, of the guide-arms $c$, made V-shaped, with the angle in front, with the lower arm nearly or quite horizontal, and with the upper arm rising gradually as it extends to the rear, said arms being connected at the middle by rods $d$, for the purpose specified.

3. In a cornstalk-harvester, the combination, with the frame C and the guides $c$, of the tie-rods $d$ and the braces $e$, substantially as herein shown and described, whereby the said guides are strengthened in place, as set forth.

4. In a cornstalk-harvester, the combination, with the double-walled rear parts of the casings W and the hinged platform E, of the flanges $f$, substantially as herein shown and described, whereby stalks are kept from getting between the said casings and platform, as set forth.

WILLIAM I. ELY.

Witnesses:
T. A. WARD,
CHAS. H. ELY.